United States Patent [19]

Vasconcellos et al.

[11] Patent Number: 4,525,280

[45] Date of Patent: Jun. 25, 1985

[54] PROCESS FOR SEPARATING A WATER DISPERSION OF ASH, SLAG AND CHAR PARTICULATE MATTER

[75] Inventors: Stephen R. Vasconcellos, Fishkill; Farrokh Yaghmaie, Wappingers Falls; Paul E. Howe, Glenham, all of N.Y.

[73] Assignee: Texaco Inc., White Plains, N.Y.

[21] Appl. No.: 527,138

[22] Filed: Aug. 29, 1983

[51] Int. Cl.³ .............................................. C02F 1/54
[52] U.S. Cl. ..................................... 210/728; 210/729
[58] Field of Search ............... 210/712, 713, 708, 725, 210/727, 728, 729, 737, 787, 723

[56] References Cited

U.S. PATENT DOCUMENTS 3,349,029 10/1967 Cheng ................................. 210/727
4,146,473 3/1979 Edelmann et al. ................... 210/728

FOREIGN PATENT DOCUMENTS 1087348 1/1975 Japan .................................. 210/727

*Primary Examiner*—Barry S. Richman
*Assistant Examiner*—John Donofrio
*Attorney, Agent, or Firm*—Robert A. Kulason; Albert Brent

[57] ABSTRACT

Rapid precipitation of the particulate solids e.g. ash, slag, char and mixtures thereof in dilute dispersions of quench cooling and/or scrubbing water as produced in the partial oxidation process for ash-containing solid carbonaceous fuels is effected by mixing with said dispersion an anionic sulfonate surfactant and a water soluble divalent metal salt.

16 Claims, No Drawings

PROCESS FOR SEPARATING A WATER DISPERSION OF ASH, SLAG AND CHAR PARTICULATE MATTER

BACKGROUND OF THE INVENTION

This invention relates to a process for separating out the solid particulate matter in a dilute stream of gas quench cooling and/or scrubbing water. More particularly, it relates to a process for separating out the solid particulate matter in a water dispersion of particulate solids from the group comprising ash, slag, char, and mixtures thereof as produced by cooling and/or scrubbing with water the hot gas stream from the partial oxidation of ash-containing solid carbonaceous fuels.

Ash containing solid carbonaceous fuels e.g. coal, lignite, oil shale, tar sands have been used as fuel in the partial oxidation process for the production of synthesis gas, reducing gas, and fuel gas. Reference is made for example to coassigned U.S. Pat. Nos. 3,544,291; 3,976,442; and 3,996,026.

The hot raw gas stream leaving the reaction zone of the gas generator for the partial oxidation of ash-containing solid carbonaceous fuel contains entrained solid particulate matter e.g. slag, ash and char. The temperature of the raw effluent gas stream is in the range of about 1700° to 3000° F. The raw gas stream may be cooled by direct quenching in water. Alternatively, the hot raw gas stream may be partially cooled by indirect heat exchange and then scrubbed with water. Substantially all of the entrained solids are removed from the gas stream during the quench cooling and/or scrubbing operation and a dilute water dispersion is formed. It is of economic importance to remove the solid material from the quench and/or scrubbing water and recycle the clarified water in the process. Where the solid fines are rich in carbon, it is desirable to recycle them to the gas generator as a portion of the feed.

One major problem in recovering and recycling these solid fines from dilute water dispersions is their resistance to settling. This resistance is caused by their natural hydrophobicity and fine particle size. The hydrophobic nature of these solids prevents them from becoming completely wetted. Further, there is a tendency for them to seek out air/water interfaces, either at the surface or in pockets caused by agitation. The result is a suspension from which it is difficult to collect the solid particulate. Recovery becomes expensive. Even for example with vacuum filtration, a substantial amount of the fines e.g. 10–25% remains in suspension.

It was unexpectedly found that by the subject process, the particulate matter comprising ash, slag, char, and mixtures thereof in the dilute dispersions of quench and scrubbing water can be made to rapidly separate from the water. The clarified water may be then recycled to the quench cooling and/or scrubbing zone; and any solid particulates which are rich in carbon may be recycled to the gas generator as a portion of the fuel. The efficiency of the process is thereby increased.

SUMMARY OF THE INVENTION

This is a process for separating a dilute water dispersion of ash, slag and char particulate matter formed by quench cooling and/or scrubbing with water the hot raw effluent gas stream from the reaction zone of a gas generator for the partial oxidation of a solid carbonaceous fuel with a free-oxygen containing gas in the presence of a temperature moderator. The dilute water dispersion of particulate solids from the group comprising ash, slag, char, and mixtures thereof having a solids content in the range of about 0.2 to 4.0 wt. % at a temperature in the range of about 60° to 700° F., and an pressure in the range of about 1–250 atmospheres, is mixed with an anionic sulfonate surfactant and a soluble divalent metal salt. For example, the anionic sulfonate surfactant may be a salt selected from the group consisting of dialkylester of sulfosuccinic acid, alkyl aryl sulfonic acid, and mixtures thereof. The divalent metal salt may be a chloride of barium, calcium, magnesium, and mixtures thereof. The surfactant and metal salt are mixed together with the dilute water dispersion in a gravity settler or by means of a static mixer and rapid separation of the solid particulate matter takes place. A clarified water stream may be then obtained with a gravity settler by decanting. Alternatively, a conventional solids-liquid separator such as one selected from the group consisting of at least one liquid cyclone, centrifuge, settler, clarifier, screen, filter, and combinations thereof may be used to separate the clarified water from the solid particulate matter. The efficiency of the partial oxidation process is improved by the subject invention since a stream of clarified water is rapidly produced and may be recycled to the quench cooling and/or scrubbing zone. Further, any carbon containing solid particulate matter that may be recovered may be recycled and mixed with fresh solid carbonaceous fuel to produce a slurry feed mixture to the partial oxidation gas generator.

DESCRIPTION OF THE INVENTION

Synthesis gas, reducing gas and fuel gas comprising mixtures of $H_2$, CO and various amounts of other gases may be made by the partial oxidation process, such as described in coassigned U.S. Pat. Nos. 3,544,291, 3,998,609 and 4,289,502, which are incorporated herein by reference. Advantageously, the partial oxidation process may use as feedstock comparatively low-cost readily available ash-containing solid carbonaceous fuels. For example, the following ash-containing solid carbonaceous fuels are suitable feedstocks and include by definition: coal i.e. anthracite, bituminous, subbituminous, or lignite; particulate carbon; coke from coal; petroleum coke; oil shale; tar sands; asphalt; pitch; and mixtures thereof. In the partial oxidation process, ground solid fuel is introduced into the gas generator either alone or in the presence of a substantially thermally vaporizable hydrocarbon and/or water, or entrained in a temperature moderator such as steam, $CO_2$, $N_2$ and recycle synthesis gas. The term free-oxygen containing gas, as used herein is intended to include air, oxygen-enriched air, i.e. greater than 21 mole % oxygen, and substantially pure oxygen, i.e. greater than 95 mole % oxygen (the remainder comprising $N_2$ and rare gases).

Entrained in the hot raw gas stream leaving the reaction zone of the gas generator at a temperature in the range of about 1700° to 3000° F. is particulate matter from the group comprising ash, slag, char, and mixtures thereof. The concentration of solids in the hot raw gas stream may be in the range of about 0.1 to 4 grams per standard cubic foot (SCF). The composition will depend upon the type of solid carbonaceous fuel and the temperature and operating conditions of the partial oxidation gas generator. By definition: Ash in the raw gas stream is the remnants of completely combusted particles of the solid carbonaceous fuel. The ash particles in the hot gas stream have not reached the melting temperature of the mineral matter originally contained in the solid fuel. These ash particles are typically less than 74 microns in size. Typical compositions of the ash particles in the gas stream from a coal feed for example in wt. % follow: $SiO_2$ 58.8–62.6; $Al_2O_3$ 15.8–20.0; $Fe_2O_3$ 3.3–5.1; $TiO_2$ 0.8–1.4; $CaO$ 5.3–7.6; $MgO$ 0.5–1.6; $Na_2O$ 0.2–0.4; $K_2O$ 0.4–0.7; $P_2O_3$ 0.1–0.3; and $SO_3$ 0.9–3.2. Slag is substantially molten ash or molten ash which has solified into glassy particles. Slag particles are remnants of completely burnt coal particles or slurry droplets and represent the fused mineral matter of the solid carbonaceous fuel feed. The content of mineral matter e.g. ash in a typical solid carbonaceous fuel in weight percent may be about 0.2 for petroleum coke and 20.0 for coal. The size of coarse solid particles of slag is greater than about 841 microns; and the size of fine solid particles of slag is a fraction thereof. Char is the devolatilized and partially combusted solid carbonaceous fuel particles consisting mainly of ash. The remainder of the char e.g. about 2–65 wt. % comprises carbon, and a little, if any, of hydrogen and sulfur. Char particles are porous and the size is typically below 841 microns. The particles have not reached the melting temperature of the mineral matter originally contained in the solid carbonaceous fuel. The amount of char in the effluent gas stream may be decreased by increasing the temperature of the reaction zone.

The hot raw effluent gas stream exits from the partial oxidation gas generator and may be cooled to a temperature in the range of about 60° to 950° F., such as less than about 350° F. For example, the hot gas stream may be first partially cooled by direct contact with water contained in a quench tank, such as shown in coassigned U.S. Pat. No. 4,218,423 which is incorporated herein by reference. Molten slag is solidified by the quench water and most of the ash, slag and char are transferred to the water in the quench tank. The partially cooled gas stream may be then passed through a water scrubbing operation to remove any remaining entrained particulate matter. The pressure in the quench tank is substantially the same as the gas generator located above, and a portion of the quench water at the bottom of the quench tank is removed by way of a lock hopper system and settler, such as shown in coassigned U.S. Pat. No. 3,544,291. Another stream of quench water carrying fine particles exits the gasifier quench chamber in response to a liquid level controller and is directed to a settler. Alternatively, the hot raw effluent gas stream from the reaction zone may be partially cooled, by indirect heat exchange, prior to being scrubbed with water, by being passed through a radiant or convection gas cooler. Ash and coarse and fine particles of slag and char may pass from the water sump of the gas cooler and are collected in a lock hopper vessel. The solids and water from the lock hopper may then flow by gravity into a water sump or settler where optionally the coarse particulate solids may be removed by screens thereby producing a dispersion of fine particulate solids.

The quench cooling water, scrubbing water, or both comprising water dispersions having a solids content in the range of about 0.2 to 4.0 wt. %, such as about 0.5 to 2 wt. % of particulate solids from the group ash, slag, char, and mixtures thereof are combined or separately treated in the subject process. The water dispersion at a temperature in the range of about 60° to 700° F., and a pressure in the range of about 1 to 250 atmospheres is mixed with a water soluble anionic sulfonate surfactant and a water soluble divalent metal salt. The molar concentrations of said surfactant and metal salt are each greater than about $2 \times 10^{-4}$, such as in the range of about $2 \times 10^{-4}$ to $2 \times 10^{31\ 2}$, say about $2 \times 10^{-4}$ to $2 \times 10^{-3}$. Substantially all of the particulate solids precipitate from the water dispersion. A clarified water stream substantially free from particulate solids e.g. less than 200 parts per million may be then recovered.

An anionic sulfonate surfactant found suitable for use in the subject process is a salt selected from the group consisting of dialkylester of sulfosuccinic acid, alkyl aryl sulfonic acid, and mixtures thereof. The anionic sulfonate surfactant is represented by formula I and/or II below.

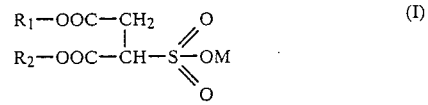

wherein $R_1$ and $R_2$, which can be the same or different, are selected from the group consisting of a substituted linear or branched alkyl of 6 to 13 carbons, and a substituted cyclic alkyl of 6 to 12 carbons; and M is selected from the group consisting of Na, $NH_4$, Ca and triethanolamine.

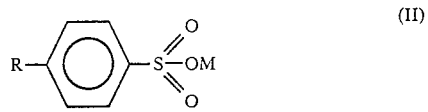

wherein R represents a substituted linear alkyl of 6 to 12 carbons; and M is selected from the group consisting of Na, $NH_4$, Ca, isopropylamine, and triethanolamine.

The subject invention utilizes the synergistic action of surfactant and electrolyte to greatly enhance the wettability of the fines in the water. It was found to be essential that both surfactant and electrolyte were present. Surfactant or electrolyte alone did not have the desired effect. Further, the electrolyte should be a divalent salt ($MX_2$). Monovalent (MX) or trivalent ($MX_3$) salts had no effect on the process.

The symbol M in the formula ($MX_2$) represents a Group II metal in the Periodic Table Of The Elements. For example, the metal portion may be selected from the group consisting of Ba, Ca, Mg, and mixtures thereof. The symbol X in the formula ($MX_2$) represents the base portion of the salt and may be selected from the group consisting of halides, e.g., Cl, Br, and F; nitrates; and mixtures thereof.

In one suitable combination of surfactant and electrolyte the anionic sulfonate surfactant is a Na-alkyl sulfosuccinate surfactant selected from the group consisting of Na(tridecyl)$_2$sulfosuccinate, Na(hexyl)$_2$sulfosuccinate, Na(cyclohexyl)$_2$sulfosuccinate, Na(octyl)$_2$sulfosuccinate, and mixtures thereof; and the divalent metal salt is a metal chloride with the metal portion being selected from the group consisting of Ba, Ca, Mg, and mixtures thereof.

In another suitable combination of surfactant and electrolyte the anionic sulfonate surfactant is an alkyl aryl sulfonate selected from the group consisting of Na dodecylbenzene sulfonate, $NH_4$ dodecylbenzene sulfonate, Ca dodecylbenzene sulfonate, isopropylaminedodecylbenzene sulfonate, triethanolaminedodecylbenzene sulfonate; and the divalent metal salt is a metal chloride with the metal portion being selected from the group consisting of Ba, Ca, Mg, and mixtures thereof.

The subject invention is believed to function by increasing the wettability of the solid particulates by reducing their hydrophobicity. The divalent salt serves to further reduce the surface tension of the surfactant, thereby enhancing its adsorption on the particles and facilitating complete wetting. Owing to their naturally high density, once wetted, the solid particulates may settle rapidly, according to Stoke's law. Over 99 wt. % of the fines precipitate out, giving a two phase mixture that can be easily separated.

Mixing of the dispersions of particulate solids from the group ash, slag, char, and mixtures thereof in quench and/or scrubbing water with the anionic sulfonate surfactant and divalent metal salt may take place in the following manner: (1) in a gravity settling tank or clarifier, at a temperature in the range of about 60° to 250° F., such as about 150° to 200° F., (2) in the quench water tank located below the reaction zone of the partial oxidation gas generator, at a temperature in the range of about 60° to 700° F., such as about 250° to 450° F., or (3) by means of a static mixer located in a pipeline leading to a settler or other conventional solids-liquid separator, at a temperature in the range of about 60° to 250° F., such as about 150° to 200° F. The in-line static mixer comprises a free-flow cylindrical conduit which encloses a plurality of fixed helical-shaped curved sheet-like elements that extend longitudinally in series. Flow division and radial mixing occur simultaneously within the conduit. There are no moving parts nor external power requirements.

Separation of clarified water from the precipitated particulate solids may be effected by decanting from a settler or clarifier. Atmospheric gravity or pressure settlers may be used. Optionally, the water dispersion may be passed through screens to remove any larger slag particles prior to the settler. At least a portion e.g. 10 to 90 volume % of the overflow stream of clarified water from the settler may be recycled to the quench cooling and/or scrubbing zone. The remainder of the clarified water may be introduced into a water treatment facility prior to discharge from the system. Depending on its carbon content, the particulate solids recovered from the bottom of the settler may be mixed with fresh ash-containing carbonaceous fuel and recycled as feed to the partial oxidation gas generator. Alternatively, the particulate solids may be used as landfill or burned as fuel in auxiliary equipment.

In another embodiment, clarified water may be separated from the precipitated particulate solids by means of conventional solids-liquid separators such as one or more liquid cyclones, also known as hydroclones, that may be connected in series and/or parallel, centrifuge, settler, clarifier, screen, filter, and combinations thereof.

EXAMPLES

The following examples illustrate preferred embodiments of the process of this invention. While preferred modes of operation are illustrated, the Examples should not be construed as limiting the scope of the invention.

Reported in Tables I to VIII below are the settling rates in milligrams per second (mg/sec) for various water dispersions of 44 micron particulate solids. e.g., ash, slag, char and mixtures thereof; surfactant; and salt. The data presented below is shown in comparison with control runs containing only water, water/surfactant, and water/salt respectively. Several classes of surfactants and different salts at various concentrations were investigated.

EXAMPLE I

In this example, those conditions that were most effective for enhancing the settling of particulate solids are summarized in Table I for the class of effective surfactants shown in Table II. Classes of surfactants that were similarly tested and found to be ineffective are listed in Table III.

TABLE I

| Molar Concentration of Surfactant | Molar Concentration of $BaCl_2$ | Wt. of Slag in 500 ml of water | Settling Rate (mg/sec) |
|---|---|---|---|
| none | none | 0.1012 | 0.00 |
| $2 \times 10^{-4}$ | none | 0.1030 | 0.57 |
| none | $2 \times 10^{-4}$ | 0.5032 | 0.56 |
| $2 \times 10^{-4}$ | $2 \times 10^{-4}$ | 0.5022 | 41.9 |

TABLE II

| CLASS OF EFFECTIVE SURFACTANTS |
|---|
| A. Na—Alkyl Sulfosuccinates |
| 1. Na (Tridecyl)$_2$ sulfosuccinate |
| 2. Na (Hexyl)$_2$ sulfosuccinate |
| 3. Na (Cyclohexyl)$_2$ sulfosuccinate |
| 4. Na (Octyl)$_2$ sulfosuccinate |
| B. Alkyl Aryl Sulfonates |
| 1. Na dodecylbenzene sulfonate |
| 2. NH$_4$ dodecylbenzene sulfonate |
| 3. Ca dodecylbenzene sulfonate |
| 4. Isopropylamine-dodecylbenzene sulfonate |
| 5. Triethanol amine-dodecylbenzene sulfonate |

TABLE III

| LIST OF INEFFECTIVE SURFACTANTS | | | |
|---|---|---|---|
| | Molar Concentration | | Settling Rate |
| Surfactant | Surfactant | BaCl$_2$ | (mg/sec) |
| Na Lauryl Sulfate | $2 \times 10^{-4}$ | $2 \times 10^{-4}$ | 1.70 |
| (Sodium Alkyl Sulfates) | $2 \times 10^{-5}$ | $2 \times 10^{-4}$ | 0.84 |
| Cetyl Trimethyl Ammonium Bromide | $2 \times 10^{-4}$ | $2 \times 10^{-4}$ | 1.20 |
| [CTAB-Alkyl Trimethyl Ammonium Halides (Br, Cl] | $2 \times 10^{5}$ | $2 \times 10^{-4}$ | 0.73 |
| Polyethylene Glycol | $2 \times 10^{-4}$ | $2 \times 10^{-4}$ | .57 |
| (Polydialcohols) | $2 \times 10^{-5}$ | $2 \times 10^{-4}$ | .54 |

EXAMPLE II

In this example, the effect of surfactant and salt concentrations are summarized in Tables IV and V. The results show that a minimum molar concentration of about $2 \times 10^{-4}$ is required for both the surfactant and the electrolyte.

TABLE IV

| EFFECT OF SURFACTANT CONCENTRATION | | | |
|---|---|---|---|
| | Molar Concentration | | Settling Rate |
| Surfactant | Surfactant | BaCl$_2$ | (mg/sec) |
| Na (Octyl)$_2$ sulfosuccinate | $1 \times 10^{-6}$ | $2 \times 10^{-4}$ | .85 |
| Na (Octyl)$_2$ sulfosuccinate | $2 \times 10^{-5}$ | $2 \times 10^{-4}$ | 7.7 |
| Na (Octyl)$_2$ sulfosuccinate | $2 \times 10^{-4}$ | $2 \times 10^{-4}$ | 41.9 |
| NH$_4$ Dodecylbenzene Sulfonate | $1 \times 10^{-6}$ | $2 \times 10^{-4}$ | 0.11 |
| NH$_4$ Dodecylbenzene Sulfonate | $2 \times 10^{-5}$ | $2 \times 10^{-4}$ | 0.84 |
| NH$_4$ Dodecylbenzene Sulfonate | $2 \times 10^{-4}$ | $2 \times 10^{-4}$ | 45.9 |

TABLE V
EFFECT OF SALT CONCENTRATION

| Surfactant | Molar Concentration Surfactant | BaCl$_2$ | Settling Rate (mg/sec) |
|---|---|---|---|
| Na (Octyl)$_2$ sulfosuccinate | 2 × 10$^{-4}$ | 1 × 10$^{-6}$ | 1.08 |
| Na (Octyl)$_2$ sulfosuccinate | 2 × 10$^{-4}$ | 2 × 10$^{-5}$ | 4.31 |
| Na (Octyl)$_2$ sulfosuccinate | 2 × 10$^{-4}$ | 2 × 10$^{-4}$ | 41.90 |

EXAMPLE III

It is demonstrated by this example from the results summarized in Table VI that the settling rate of the particulate solids is not accelerated in the absence of the proper salt.

TABLE VI
SURFACTANT WITHOUT SALT

| Surfactant | Molar Conc. | Settling Rate (mg/sec) |
|---|---|---|
| Na (Octyl)$_2$ sulfosuccinate | 2 × 10$^{-5}$ | 0.20 |
| Na (Octyl)$_2$ sulfosuccinate | 2 × 10$^{-4}$ | 0.57 |
| NH$_4$ Dodecylbenzene Sulfonate | 2 × 10$^{-5}$ | 0.27 |
| NH$_4$ Dodecylbenzene Sulfonate | 2 × 10$^{-4}$ | .59 |
| Na Lauryl Sulfate | 2 × 10$^{-5}$ | 0.34 |
| Na Lauryl Sulfate | 2 × 10$^{-4}$ | 0.34 |
| CTAB | 2 × 10$^{-5}$ | 0.20 |
| CTAB | 2 × 10$^{-4}$ | 0.29 |
| Polyethylene Glycol | 2 × 10$^{-5}$ | 0.16 |
| Polyethylene Glycol | 2 × 10$^{-4}$ | 0.17 |

EXAMPLE IV

In this example, by the results summarized in Table VII it is demonstrated that unexpectedly divalent salts (MX$_2$) are effective to produce the synergistic action with the desired surfactant, whereas monovalent (MX) or trivalent (MX$_3$) salts will not.

TABLE VII
EFFECT OF SALT TYPE

| Surfactant | Molar Conc. | Molar Salt | Molar Conc. | Settling Rate (mg/sec) |
|---|---|---|---|---|
| Na Dioctyl Sulfosuccinate | 2 × 10$^{-4}$ | BaCl$_2$ | 2 × 10$^{-4}$ | 41.9 |
| Na Dioctyl Sulfosuccinate | 2 × 10$^{-4}$ | CaCl$_2$ | 2 × 10$^{-4}$ | 40.5 |
| Na Dioctyl Sulfosuccinate | 2 × 10$^{-4}$ | MgCl$_2$ | 2 × 10$^{-4}$ | 41.3 |
| Na Dioctyl Sulfosuccinate | 2 × 10$^{-4}$ | NaCl | 2 × 10$^{-4}$ | .50 |
| Na Dioctyl Sulfosuccinate | 2 × 10$^{-4}$ | KCl | 2 × 10$^{-4}$ | .49 |
| Na Dioctyl Sulfosuccinate | 2 × 10$^{-4}$ | AlCl$_3$ | 2 × 10$^{-4}$ | .65 |

EXAMPLE V

The rapid settling rates for the ash, slag, char and mixtures thereof as derived from different solid carbonaceous fuels in dilute water dispersions are summarized in Table VIII.

TABLE III
EFFECT OF TYPE OF PARTICULATE SOLIDS

| Surfactant | Molar Conc. | Salt | Molar Conc. | Particulate Solids-Type | Settling Rate (mg/sec) |
|---|---|---|---|---|---|
| Na (Octyl)$_2$ sulfosuccinate | 2 × 10$^{-4}$ | BaCl$_2$ | 2 × 10$^{-4}$ | A | 41.9 |
| None | — | None | — | A | 0.00 |
| Na (Octyl)$_2$ sulfosuccinate | 2 × 10$^{-4}$ | BaCl$_2$ | 2 × 10$^{-4}$ | B | 15.6 |
| None | — | None | — | B | 0.0 |
| Na (Octyl)$_2$ | 2 × 10$^{-4}$ | BaCl$_2$ | 2 × 10$^{-4}$ | C | 23.20 |
| None | — | None | — | C | 0.00 |

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. A process for separating a water dispersion of particulate solids selected from the group consisting of ash, slag, char and mixtures thereof as produced in the process for the partial oxidation of ash-containing solid carbonaceous fuel comprising:

(1) mixing with said water dispersion of particulate solids at a temperature in the range of about 60° to 700° F., and a pressure in the range of about 1 to 250 atmospheres, a salt of an anionic sulfonate surfactant selected from the group consisting of Formula I, Formula II, and mixtures thereof as represented by:

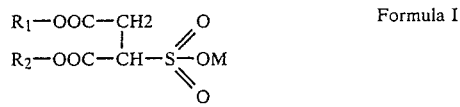

Formula I wherein R$_1$ and R$_2$, which can be the same or different, are selected from the group consisting of a substituted linear or branched alkyl of 6 to 13 carbons, and a substituted cyclic alkyl of 6 to 12 carbons; and M is selected from the group consisting of Na, NH$_4$, Ca and triethanolamine; and

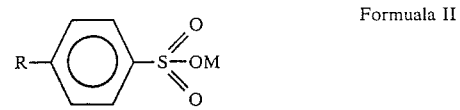

Formuala II wherein R represents a substituted linear alkyl of 6 to 12 carbons; and M is selected from the group consisting of Na, NH$_4$, Ca, isopropylamine, and triethanolamine; and a water soluble divalent metal salt consisting of a Group II metal in the Periodic Table Of The Elements in chemical combination with a member selected from the group consisting of halide, nitrate, and mixtures thereof, wherein the molar concentrations of said surfactant and metal salt are each greater than about 2×10$^{-4}$, and sufficient to decrease the hydrophobicity of the particles whereby the wettability of said particulate solids is increased to aid in their precipitation;

(2) precipitating said particulate solids from the water dispersion in (1); and (3) separating a clarified stream of water substantially free from said particulate solids.

2. The process of claim 1 wherein the mixing in (1) takes place in a gravity settling zone, the solids precipitated in (2) settle by gravity, and the clarified stream of water is separated in (3) by decanting.

3. The process of claim 1 wherein the mixing in (1) takes place in the quench water tank of a partial oxidation gas generator.

4. The process of claim 1 wherein the clarified stream of water is separated in (3) by means of a solids-liquid separation means selected from the group consisting of at least one liquid cyclone, centrifuge, settler, clarifier, screen, filter, and combinations thereof.

5. The process of claim 1 wherein the mixing in (1) takes place in a static mixing zone; and the clarified stream of water is then separated in (3) by means of a solids-liquid separation means selected from the group consisting of at least one liquid cyclone, centrifuge, settler, clarifier, screen, filter, and combinations thereof.

6. The process of claim 1 wherein said anionic sulfonate surfactant is a salt selected from the group consisting of dialkylester of sulfosuccinic acid, alkyl aryl sulfonic acid, and mixtures thereof.

7. The process of claim 1 wherein said divalent metal salt is represented by the formula:

$M(Cl)_2$ wherein M is selected from the group consisting of Ba, Ca, magnesium, and mixtures thereof.

8. The process of claim 1 wherein said anionic sulfonate surfactant is a Na-alkyl sulfosuccinate surfactant selected from the group consisting of Na(tridecyl)$_2$sulfosuccinate, Na(hexyl)$_2$sulfosuccinate, Na(cyclohexyl)$_2$sulfosuccinate, Na(octyl)$_2$sulfosuccinate, and mixtures thereof; and the divalent metal salt is a metal chloride with the metal portion being selected from the group consisting of Ba, Ca, Mg, and mixtures thereof.

9. The process of claim 1 wherein said anionic sulfonate surfactant is an alkyl aryl sulfonate selected from the group consisting of Na dodecylbenzene sulfonate, NH$_4$ dodecylbenzene sulfonate, Ca dodecylbenzene sulfonate, isopropylamine-dodecylbenzene sulfonate, triethanolaminedodecylbenzene sulfonate; and the divalent metal salt is a metal chloride with the metal portion being selected from the group consisting of Ba, Ca, Mg, and mixtures thereof.

10. In a process for reacting an ash-containing solid carbonaceous fuel with a free-oxygen containing gas in a free-flow partial oxidation gas generator to produce a hot raw effluent gas stream comprising H$_2$, CO, other gaseous material, and entrained particulate solids selected from the group consisting of ash, slag, char and mixtures thereof, the improvement comprising:

(1) cooling and scrubbing said hot raw effluent gas stream from the gas generator with water in a gas cooling and scrubbing zone, thereby removing entrained particulate solids from the effluent gas stream and producing a dilute water dispersion of particulate solids;

(2) mixing a salt of an anionic sulfonate surfactant represented by the formula

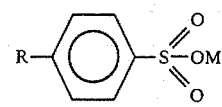

wherein R represents a substituted linear alkyl of 6 to 12 carbons; and M is selected from the group consisting of Na, NH$_4$, Ca, isopropylamine, and triethanolamine and a water soluble divalent metal salt electrolyte selected from the group consisting of chloride, nitrate, and mixtures thereof whose metal portion is selected from the group consisting of Ba, Ca, Mg, and mixtures thereof with said water dispersion; wherein the molar concentration of said surfactant and metal salt are each greater than about $2\times 10^{-4}$ and sufficient to decrease the hydrophobicity of the particles whereby the wettability of said particulate solids is increased to aid in the precipitation; and precipitating said particulate solids;

(3) separating a clarified stream of water substantially free from said particulate solids in a solids-liquid separating zone; and (4) recycling at least a portion of said clarified water to said gas cooling and scrubbing zone.

11. The process of claim 10 wherein the solids-liquid separating zone in (3) is selected from the group consisting of at least one liquid cyclone, centrifuge, settler, clarifier, screens, filter, and combinations thereof.

12. The process of claim 10 wherein said ash-containing solid carbonaceous fuel is selected from the group consisting of anthracite; bituminous coal; subbituminous coal; lignite; particulate carbon; coke from coal; petroleum coke; oil shale; tar sands; asphalt; pitch; and mixtures thereof.

13. The process of claim 10 wherein said free-oxygen containing gas is selected from the group consisting of air, oxygen-enriched air which is greater than 21 mole % oxygen, and substantially pure oxygen which is greater than 95 mole % oxygen.

14. The process of claim 10 wherein the gas cooling and scrubbing zone in (1) includes a quench tank and gas scrubbing means.

15. The process of claim 10 wherein the gas cooling and scrubbing zone in (1) includes radiant and/or convection gas cooling means and gas scrubbing means.

16. The process of claim 10 wherein at least a portion of the solids separated in (3) are recycled to the gas generator in admixture with fresh solid carbonaceous fuel.

* * * * *